United States Patent
Adams et al.

(10) Patent No.: US 10,210,674 B2
(45) Date of Patent: Feb. 19, 2019

(54) TRAIN HANDLING RULES COMPLIANCE SYSTEM

(71) Applicant: New York Air Brake, LLC, Watertown, NY (US)

(72) Inventors: Sean Adams, Elk Grove, CA (US); Mark Fugate, Colleyville, TX (US)

(73) Assignee: New York Air Brake, LLC, Watertown, NY (US)

( * ) Notice: Subject to any disclaimer, the term of this patent is extended or adjusted under 35 U.S.C. 154(b) by 75 days.

(21) Appl. No.: 15/093,915

(22) Filed: Apr. 8, 2016

(65) Prior Publication Data

US 2017/0294058 A1    Oct. 12, 2017

(51) Int. Cl.
| | |
|---|---|
| *B61L 3/00* | (2006.01) |
| *G07C 5/00* | (2006.01) |
| *G07C 5/08* | (2006.01) |
| *B61L 15/00* | (2006.01) |
| *B61L 27/00* | (2006.01) |
| *B61L 27/04* | (2006.01) |
| *H04L 29/08* | (2006.01) |

(52) U.S. Cl.
CPC ............ *G07C 5/0808* (2013.01); *B61L 3/002* (2013.01); *B61L 15/0081* (2013.01); *B61L 27/0077* (2013.01); *B61L 27/04* (2013.01); *G07C 5/008* (2013.01); *H04L 67/12* (2013.01)

(58) Field of Classification Search
CPC ... G07C 5/0808; G07C 5/008; B61L 27/0077; B61L 27/04; H04L 67/12
See application file for complete search history.

(56) References Cited

U.S. PATENT DOCUMENTS

| | | | |
|---|---|---|---|
| 6,622,067 B1* | 9/2003 | Lovelace, II | B61L 3/125 |
| | | | 701/19 |
| 7,051,044 B1* | 5/2006 | Fera | B61L 27/0094 |
| 8,850,000 B2 | 9/2014 | Collins et al. | |
| 9,296,401 B1 | 3/2016 | Palmer et al. | |
| 9,428,202 B2 | 8/2016 | Perras et al. | |
| 9,688,296 B2* | 6/2017 | Shubs, Jr. | B61L 27/0077 |
| 2002/0065698 A1* | 5/2002 | Schick | B61L 27/0094 |
| | | | 705/7.36 |
| 2003/0222981 A1 | 12/2003 | Kisak et al. | |

(Continued)

OTHER PUBLICATIONS

International Search Report and Written Opinion Form PCT/ISA/220, International Application No. PCT/US2016/26641 pp. 1-12, dated Apr. 8, 2016, dated Jan. 3, 2017.

*Primary Examiner* — Michael J Zanelli
(74) *Attorney, Agent, or Firm* — Bond Schoeneck and King PLLC; David Nocilly

(57) ABSTRACT

A system that determines state of a locomotive and transmits the occurrence of any predetermined events to an off-board system. The onboard subsystem includes an event detection module programmed to receive data defining the state of a locomotive to determine whether the received state of the locomotive comprises an event as well as a transmission module programmed to transmit to an off-board subsystem data defining a status. An onboard database have reference variable values is used to compare the existing state of the locomotive to predetermined events. If an event is determined to have occurred, the occurrence of the event is transmitted to the off-board system.

8 Claims, 2 Drawing Sheets

(56) References Cited

U.S. PATENT DOCUMENTS

2008/0258909 A1* 10/2008 Meyer ................... B61L 3/002
340/539.25
2015/0291193 A1* 10/2015 Perras .................. B61L 25/025
246/122 R

* cited by examiner

TRAIN HANDLING RULES COMPLIANCE SYSTEM

BACKGROUND OF THE INVENTION

1. Field of the Disclosure

The present invention relates to train monitoring systems and, more particularly, to a system for predicting, detecting and transmitting locomotive events that fail to comply with train handling rules.

2. Description of the Related Art

Train handling rules govern the operation of trains in various locations and conditions. Compliance with train handling rules is mandatory and the failure to comply can result in serious consequences. Accordingly, there is a need in the art for a system that can automatically evaluate whether the operation of a train is in compliance with train handling rules and track whether any non-compliant events have occurred.

BRIEF SUMMARY OF THE INVENTION

The present invention comprises a system for determining and transmitting the state of a locomotive. The system includes an onboard subsystem having an event detection module programmed to receive data representing at least one state of a locomotive and to determine whether a predetermined event has occurred based on the at least one state of the locomotive. The onboard system also includes a transmission module programmed to transmit data representing the determination by the onboard subsystem that an event has occurred. The onboard subsystem is programmed to determine whether a predetermined even has occurred by retrieving a reference variable having a predetermined value from a database. The onboard subsystem is further programmed to determine whether a predetermined event has occurred if the state of the locomotive exceeds the predetermined value of reference variable, such as one retrieved from a configuration file. The transmission module is programmed to transmit data representing the determination by the onboard subsystem that an event has occurred when the onboard system has determined that a predetermined event has occurred. The transmission module is further programmed to transmit the state of the locomotive according to a predetermined schedule. The system may also include one or more sensors for detecting the state of a locomotive that are associated with the locomotive and in communication with the onboard system. The off-board subsystem includes a reporting module programmed to receive data representing the determination by the onboard subsystem that an event has occurred from the transmission module data and to generate a status report from the data. The off-board subsystem may further includes a storage module programmed to store at least a portion of the data representing the determination by the onboard subsystem that an event has occurred. The reporting module may transmit data to a remote server or user, such as by a web interface.

The system is implemented by using the onboard system to receive data representing the state of a locomotive from at least one sensor and then determining whether the received data represents the occurrence of a predetermined event. The system may then transmit data representing the occurrence of a predetermined event to an off-board system. The step of determining whether the received data represents the occurrence of a predetermined event involves retrieving a reference variable having a predetermined value, such as from a configuration file, and comparing the received data to the reference variable to determine whether the received data exceeds the predetermined value of the reference variable. The transmitting of data representing the occurrence of a predetermined event to an off-board system can occur when the received data is determined to represent the occurrence of the predetermined event or according to a predetermined schedule.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
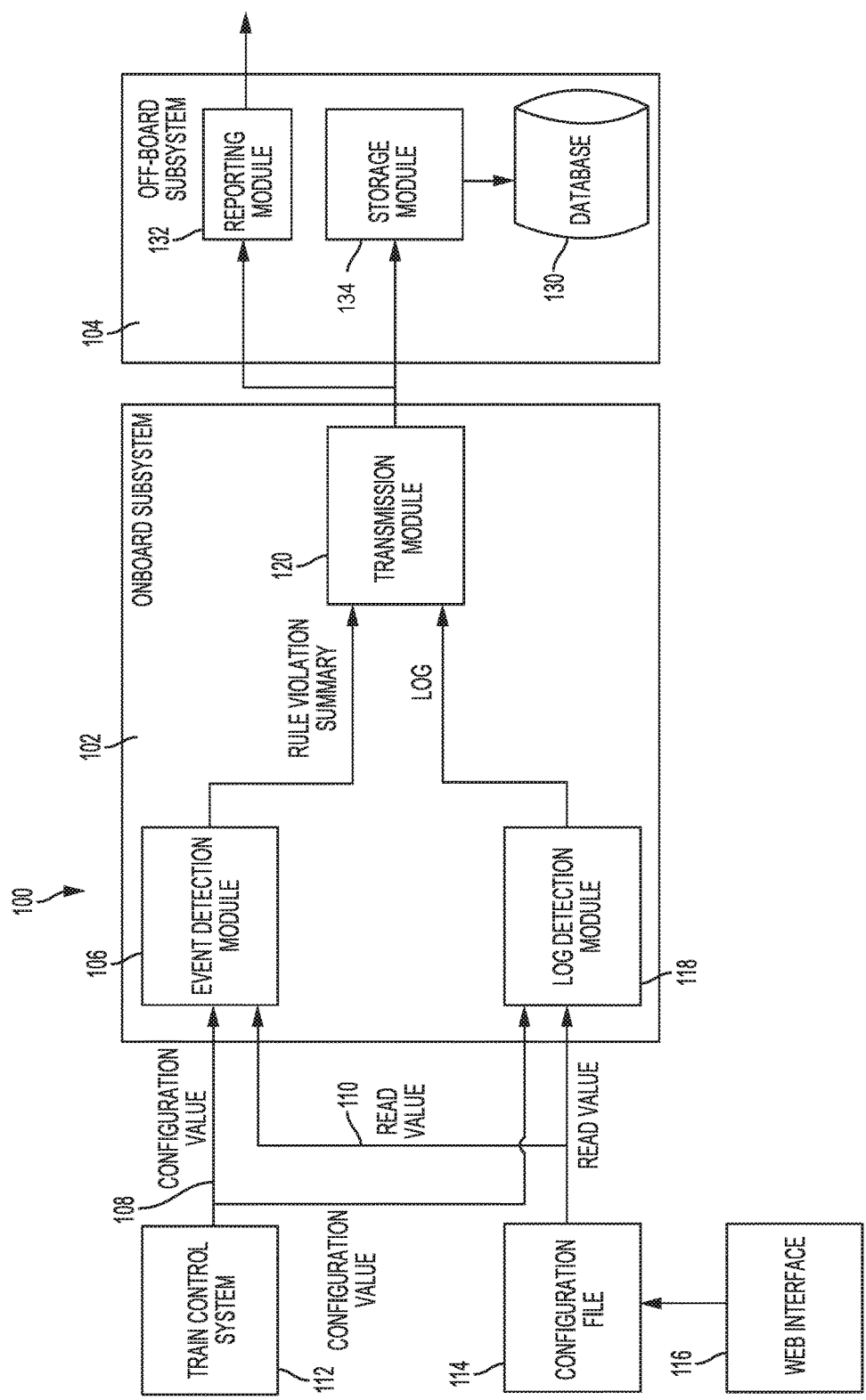
FIG. 1 is a schematic of an event detection system in accordance with an embodiment.

Referring now to the drawings, wherein like reference numerals refer to like parts throughout, there is seen in FIG. 1 a train handling rules compliance system 100 comprising an onboard subsystem 102 that is programmed to determine whether the operation of the train is in compliance with applicable train handling rules. Onboard subsystem 102 may be provided in combination with or as part of a train control system 112, such as the LEADER train control system available from New York Air Brake LLC of Watertown, N.Y. Onboard subsystem 102 is configured to receive or obtain data representing the state of the locomotive from train control system 112 and/or other sources, such as an engineer, using that data as well as locally stored data to determine whether a non-compliant event has occurred. Onboard subsystem 102 is further in communication with an off-board subsystem 104 and is programmed to transmit data surrounding any non-compliance events to off-board subsystem 104. Onboard subsystem 102 may additionally provide regular status information to off-board subsystem 104 in the form of a log. Complementarily, off-board subsystem 104 is programmed to prepare reports based on non-compliance events identified by onboard subsystem 102 and to maintain records of the operation of the locomotive.

As shown in FIG. 1, onboard subsystem 102 may be implemented on a computing device having a non-transitory storage medium. Onboard subsystem 102 includes an event detection module 106 that is programmed to receive read value 110, representing at least one state of a locomotive and to determine whether a train handling rule violation has occurred by comparing the read value 110 with a predetermined configuration value 108, representing a value associated with a train handling rule. Upon determining that a train handling rule violation has occurred, event detection module 106 may be further programmed to deliver data representing a rule violation summary to transmission module 120. Onboard subsystem 102 may also include a log generating module 118 programmed to receive read value 110 and to periodically generate a log of, at least, the received read value 110. Onboard subsystem may also include a transmission module 120 programmed to transmit to off-board subsystem 104 the received logs and rule violation summaries.

Configuration value 108 may be received from a configuration file 114 stored on onboard subsystem 102, or any other storage medium suitable for receiving and storing configuration value 108. Configuration file 114 may be loaded externally at any time, or at a predetermined time to vary the parameters of the compared train handling rule. For example, a new configuration file may be loaded prior to the start of a particular route to tailor the train handling rules to that route. As shown in FIG. 1, the configuration file may also be accessed via a web interface to modify the configuration values and, consequently, the train handling rules at any time.

Figure 2:
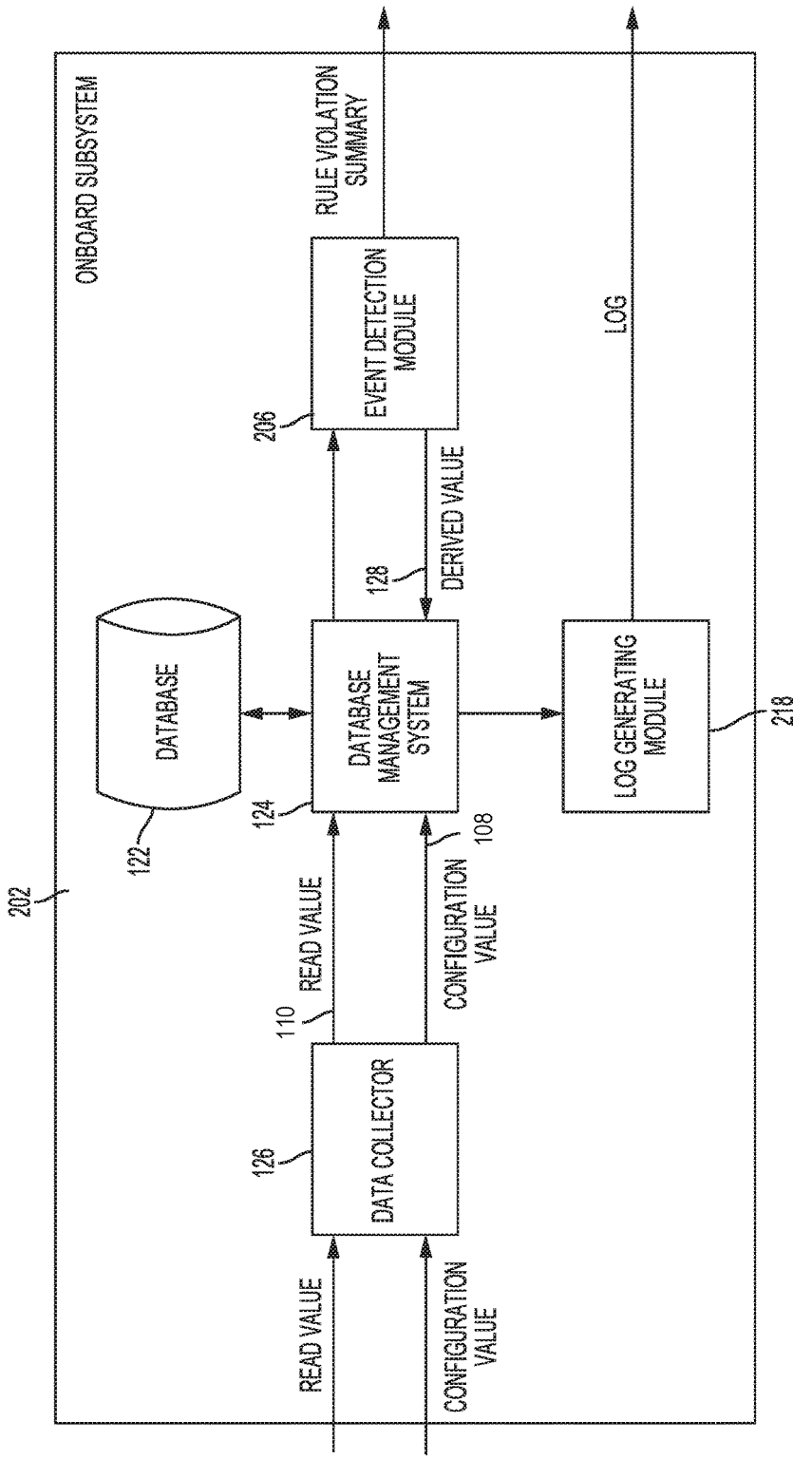
FIG. 2 is a schematic of an onboard subsystem in accordance with an embodiment.

Referring now to FIG. 2, onboard subsystem 102 may be implemented as a database server instance, defined by software such as MySQL, MSSQL, or Oracle. As such, onboard subsystem 102 may include a database 122, and a database management system 124, configured to store, modify, and access information on the database 122. For example, database 122 may be a relational database and database management system 124 a relational database management system; however, one of skill in the art will recognize that any database architecture may be used that is sufficient for storing read values 110 and configuration value 108.

Database 122 may receive and store, via database management system 124, the read value 110 and configuration value 108. These values may be inserted into database 122 by a data collection module 126, using, for example, SQL stored procedures as the data becomes available from the train control system 112 or other sources. The rate at which each value becomes available may depend upon the particular value.

Transmission module 120 may use any conventional approaches for transmitting data to off-board subsystem 104. For example, transmission module 120 may initiate a secure shell connection with off-board subsystem 104, transmit the appropriate data, and then look for an acknowledgement from off-board subsystem 104 that the data has been received. One of ordinary skill in the art will recognize that the onboard subsystem 102 may employ any system or protocol in the art for transmitting data to a remote server.

As shown in FIG. 2, event detection module 206 and log generating module 218 may be connected to and configured to receive from the database management system 124 the stored read 110 and configuration 108 values. For example, event detection module 206 may query specific values from database management system 124 or may periodically query a table of values stored in database 122. Alternatively, database management system 124 may be configured to deliver values stored in database 122 to event detection module 206. Similarly, a table of values stored in database 122 may be delivered to log generating module 118 as required.

Log generating module 218 is programmed to periodically deliver a log to transmission module 120. For example, onboard subsystem 202 may be equipped with process scheduling facilities to schedule the delivery of the log files, at a predetermined time, or periodically, such as at fifteen minute intervals. Alternatively, the log files may be delivered upon the demand of off-board subsystem 104. Each log file may contain all the data stored in database 122 or a select portion of the data, such as only the read value 110.

Event detection module 106 may be implemented as a rule-based system. For example, event detection module 106 may be programmed to implement a set of rule statements, implemented as IF-THEN statements, to determine whether train handling rule violation has occurred. Read value 110 and configuration value 108 may serve as inputs for the rule statements and the output of each rule statement may be stored in database 122.

If the output of a rule statement represents a train handling rule violation, it may cause the event detection module to generate a rule violation summary. One of ordinary skill will recognize that a single rule statement or a combination of rule statements may form a single train handling rule violation. A rule violation summary, in one implementation, may comprise a data dump of the data stored in database 122. Alternatively, it may comprise information associated with the particular rule violated. Similarly, the log output may comprise a data dump of database 122. Alternatively, the log output may comprise a dump of only received read value 110. One of ordinary skill in the art will recognize that the rule violation summary and log outputs may be comprised of at least any data in database 122, as is useful for determining the state of a locomotive or a rule violation if one has occurred.

Each rule statement may take the form (or a form similar to):

READ VALUE>CONFIGURATION
    VALUE=>EVENT=TRUE

Meaning, if read value 110 is greater than configuration value 108 then the event is true. One of ordinary skill in the art will readily recognize that this statement is merely exemplary and may take any form as is understood in the art. However, each rule statement generally contains at least one Boolean conditional, a read value 110 forming the left side of the Boolean conditional and the configuration value 108 forming the right side of the Boolean conditional. For example, one rule statement may be:

(SPEED>MIN_SPEED) AND
    (PCS_CLOSED>PCS_TIME)=>EV=TRUE where SPEED and PCS_CLOSED are read value 110 and MIN_SPEED and PCS_TIME are configuration value 108. Here, SPEED and PCS_CLOSED each form the left side of a Boolean conditional and configuration value 108 MIN_SPEED and PCS_TIME each form the right side of a Boolean conditional. Further, the two Boolean conditionals are joined by another conditional: the AND statement. Thus, this expression means that if the value of SPEED (the speed of the locomotive) is greater than the value of MIN_SPEED, and the variable PCS_CLOSED is greater than time specified by PCS_TIME, then the output EV is true. Accordingly, the rule statements may be formed of a combination of Boolean conditionals.

Event detection module 206 may further employ the output of any rule statement as an input to a later-executed rule statement. For example if the following rule statement marks the beginning of an event:

((SPEED>MIN_SPEED) AND
    (SPEED<MAX_SPEED))>=MAX_SPEED
    TIME=>SPEED_EVENT=TRUE

The output, SPEED_EVENT, may be an input to a second rule statement identifying the end of the event:

((SPEED<MIN_SPEED)>=EVENT_TIMER) AND
    SPEED_EVENT=>SPEED_EVENT=FALSE

Thus, the output of the first rule statement defining the beginning of the speed event may be used as the input to the second rule statement defining the end of the event. Indeed, rule statement outputs may be the only inputs to a rule statement, such as:

ZERO_SPEED_FLAG and CVE_EVENT

Where ZERO_SPEED_FLAG and CVE_EVENT are both outputs to earlier-executed rule statements.

Furthermore, each rule statement may call an internally defined function to define a value not otherwise provided. For example, the following rule statement calls:

(SPEED>HR_SPEED) AND (BRAKE_PIPE_PRES-
    SURE<=(AB_NOMINAL-HR_AB_LIMIT)
    AND PCS_CLOSE

Where PCS_CLOSE is a value obtained from a rule statement defined by the following rule statement:

(PCS_OPEN)>=HR_TIME_AB_LIMIT which indicates whether the pneumatic control switch has been open for a period of time greater than a configuration value, HR_TIME_AB_LIMIT, which defines the time boundary for the pneumatic control switch to air brake application in seconds. The internally defined values obtained from rule statement outputs and internally defined functions may be collectively referred to as derived values 128. Derived values 128 may be inputted to database 122 via database management system 124, for use in later-executed rule statements.

Event detection module 106 may execute each rule statement as the data requisite for that statement becomes available. For example, as data is input into database 122, either from a prior executed rule statements or inputted read or configuration values, event detection module 106 may compare the available inputs to each rule statement. Any rule(s) that may be executed with the given data is executed. If multiple executable rules may be executed concurrently, the rules are prioritized according to any method known in the art. This way rules are executed as data becomes available. Alternatively, the read values 110 or derived values 128 may be queried periodically and at a predetermined interval such as every second. This would result in database 122 being updated regularly according to the predetermined interval. In this implementation, the rules statements could be executed every time database 122 is updated.

When the speed of the locomotive is zero, transmission module 120 may be programmed to send a status update, blank message, acknowledgment, or other small data message indicating that the train is stationary to reduce the bandwidth allocated to system 100 as it is not required to be in use.

Referring again to FIG. 1, off-board subsystem 104 includes a reporting module 132 and a storage module 128. Storage module 134 is configured to store data received from onboard subsystem 102 in a database 130 so that the data is organized and may be retrieved at a later time for use in generating a status report. Storage module 134 may also be implemented as a relational database with a relational database management system. If onboard subsystem 202 is provided with database 122, storage module 134 may be configured to receive and store all data such that database 130 maintained by storage module 134 mirrors database 122 of onboard subsystem 202. Off-board subsystem 104 may implemented in a single server or distributed over several servers to meet the needs of the particular application. Off-board subsystem 104 may also be connected to and receive data from a plurality of onboard subsystem 102, such that off-board subsystem 104 operates as a hub to a plurality of locomotives, each with their own onboard subsystem 102. Alternatively, each server implementing off-board subsystem 104 may have a reporting module 132 for each unique locomotive with an onboard subsystem 102. Storage module 134 may also be located on one server and partitioned to maintain data from multiple locomotives each having its own onboard subsystem 102.

Reporting module 132 is programmed to receive the data sent from onboard subsystem 102 about non-compliance events and then prepare status reports based on the data received from onboard subsystem 102. Status reports may contain real-time status data, or additional data, such as history of status data sent from a particular onboard subsystem 102 or the context of the locomotive from which status data was sent. One of ordinary skill in the art will recognize that the report may contain any additional data necessary or helpful for a downstream device or user. For example, off-board subsystem 104 may be interconnected via an interface to a web server or other remote service such as back office system to which the reports may be delivered. Similarly, storage module 134 may be accessed remotely via interface so that a remote system can retrieve stored data received from onboard system 102. Thus, a back office user may query recent or historical status data sent by onboard subsystem 102 or status reports generated by off-board subsystem 104.

As described above, the present invention may be a system, a method, and/or a computer program product and is described herein with reference to flowcharts and block diagrams of methods, apparatus (systems). The flowchart and block diagrams illustrate the architecture, functionality, and operation of possible implementations of systems, methods, and computer program products of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part of (or all of) one of more of the blocks illustrated in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for determining and transmitting the state of a locomotive, comprising:
    at least one sensor for detecting the state of a locomotive;
    an onboard subsystem in communication with the sensor and having an event detection module programmed to receive data representing at least one state of a locomotive and to determine whether a predetermined non-compliant event representing a failure to operate the locomotive in compliance with at least one predetermined train handling rule has occurred based on the at least one state of the locomotive, wherein the event detection module is programmed to determine the non-compliant event by retrieving a reference variable having a predetermined value from a configuration file stored in an onboard database and comparing the predetermined value to the data representing the at least one state of the locomotive as the data becomes available to determine whether operation of the locomotive fails to comply with a rule statement based on the predetermined value, wherein the onboard subsystem is configured to receive the configuration file from an external source prior to the locomotive starting a route;

a transmission module programmed to transmit data representing the determination by the onboard subsystem that the non-compliant event has occurred; and an off-board subsystem including a reporting module programmed to receive the data representing the determination by the onboard subsystem that an event has occurred from the transmission module data and to generate a status report from the data, wherein the off-board subsystem further includes a storage module programmed to store at least a portion of the data representing the determination by the onboard subsystem that an event has occurred.

2. The system of claim 1 wherein the onboard subsystem is further programmed to determine whether the predetermined non-compliant event has occurred if the state of the locomotive exceeds the predetermined value of reference variable.

3. The system of claim 1 wherein the transmission module is programmed to transmit data representing the determination by the onboard subsystem that the predetermined non-compliant event has occurred when the onboard system has determined that the predetermined non-compliant event has occurred.

4. The system of claim 3, wherein the transmission module is further programmed to transmit the at least one state of the locomotive according to a predetermined schedule.

5. The system of claim 4, wherein the reporting module is further programmed to transmit data via a web interface.

6. The system of claim 5, wherein the reporting module is further programmed to transmit data to remote server.

7. A method of tracking state of a locomotive, comprising:
using an onboard system to receive data representing the state of a locomotive from at least one sensor, wherein the onboard system comprises an event detection module programmed to receive data representing at least one state of a locomotive and to determine whether a predetermined non-compliant event representing a failure to operate the locomotive in compliance with at least one predetermined train handling rule has occurred based on the at least one state of the locomotive, wherein the event detection module is programmed to determine the non-compliant event by retrieving a reference variable having a predetermined value from a configuration file stored in an onboard database and comparing the predetermined value to the data representing the at least one state of the locomotive as the data becomes available to determine whether operation of the locomotive fails to comply with a rule statement based on the predetermined value, wherein the onboard subsystem is configured to receive the configuration file from an external source prior to the locomotive starting a route, and a transmission module programmed to transmit data representing the determination by the onboard subsystem that the non-compliant event has occurred;

determining whether the received data represents the occurrence of a predetermined non-compliant event representing a failure to operate the locomotive in compliance with at least one predetermined train handling rule; and transmitting data representing the occurrence of the predetermined non-compliant event to an off-board system, wherein the off-board subsystem further includes a storage module programmed to store at least a portion of the data representing the determination by the onboard subsystem that an event has occurred.

8. The method of claim 7, wherein the step of transmitting data representing the occurrence of the predetermined non-compliant event to an off-board system occurs when the received data is determined to represent the occurrence of the predetermined non-compliant event.

* * * * *